US008477142B2

(12) United States Patent
Dufourd et al.

(10) Patent No.: US 8,477,142 B2
(45) Date of Patent: Jul. 2, 2013

(54) OPTIMISED METHODS OF CREATING AND RENDERING OF A MULTIMEDIA SCENE COMPRISING AT LEAST ONE ACTIVE OBJECT, WITHOUT PRIOR MODIFICATION OF THE SEMANTICS AND/OR THE FORMAT DESCRIBING THE SCENE

(75) Inventors: Jean-Claude Dufourd, Le Kremlin Bicetre (FR); Julien Perron, Rennes (FR); Nicolas Pierre, Marpire (FR)

(73) Assignee: Streamezzo, Paris (FR)

( * ) Notice: Subject to any disclaimer, the term of this patent is extended or adjusted under 35 U.S.C. 154(b) by 444 days.

(21) Appl. No.: 12/305,928

(22) PCT Filed: Jun. 21, 2007

(86) PCT No.: PCT/EP2007/056223
§ 371 (c)(1),
(2), (4) Date: Aug. 31, 2009

(87) PCT Pub. No.: WO2007/147878
PCT Pub. Date: Dec. 27, 2007

(65) Prior Publication Data
US 2010/0177104 A1     Jul. 15, 2010

(30) Foreign Application Priority Data

Jun. 21, 2006   (FR) .................................. 06 05563

(51) Int. Cl.
*G06T 1/00*     (2006.01)
*G09G 5/00*     (2006.01)
*G06F 7/00*     (2006.01)

(52) U.S. Cl.
USPC ........................... 345/522; 345/619; 707/797

(58) Field of Classification Search
USPC ........................................................ 345/522
See application file for complete search history.

(56) References Cited

U.S. PATENT DOCUMENTS

| 6,236,727 | B1 * | 5/2001 | Ciacelli et al. | 380/212 |
| 6,895,555 | B1 * | 5/2005 | Ando | 715/719 |
| 7,145,562 | B2 * | 12/2006 | Schechter et al. | 345/420 |

(Continued)

FOREIGN PATENT DOCUMENTS

EP   1006728 A2   6/2000

OTHER PUBLICATIONS

F. Casalino et al.: "MPEG-4 Systems, Concepts and Implementation" Lecture Notes in Computer Science, Springer Verlag, Berlin, DE, May 26, 1998.

(Continued)

*Primary Examiner* — James A Thompson
*Assistant Examiner* — Fikru Gennene
(74) *Attorney, Agent, or Firm* — Zilka-Kotab, PC

(57) ABSTRACT

A method is provided for creating at least one multimedia scene intended to be restored on a mobile radio communication terminal. The multimedia scene includes a plurality of multimedia objects organized in the form of at least one scene description tree. Such a method includes the following steps: associating with the scene description tree(s) a sub-tree of the objects to be restored, including objects intended to be restored at a given instant, and a standby sub-tree, including objects intended not to be restored at the given instance; identifying at least one object, termed the transferable object, that can be transferred from a first of the sub-trees to the second of the sub-trees as a function of at least one predetermined transfer condition.

17 Claims, 4 Drawing Sheets

U.S. PATENT DOCUMENTS

2003/0110297 A1* 6/2003 Tabatabai et al. ............. 709/246
2003/0120823 A1* 6/2003 Kim et al. ..................... 709/310
2006/0274070 A1* 12/2006 Herman et al. ............... 345/474

OTHER PUBLICATIONS

"MPEG-4 Overview (Dublin Version)". International Organization for Standardization—Organisation Internationale De Normalisation, ISO/IEC JTC1/SC29/WG11, Coding of Moving Pictures and Audio, Jul. 1998.

French Search Report of Counterpart Application No. 06/05563 Filed on Jun. 21, 2006.

International Search Report of Counterpart Application No. PCT/EP/2007/056223 Filed on Jun. 21, 2007.

International Preliminary Report on Patentability of Counterpart Application No. PCT/EP20071056223 Filed on Jun. 21, 2007.

Notice of Grant from French Patent Application No. 06 05563, dated Aug. 30, 2012.

* cited by examiner

OPTIMISED METHODS OF CREATING AND RENDERING OF A MULTIMEDIA SCENE COMPRISING AT LEAST ONE ACTIVE OBJECT, WITHOUT PRIOR MODIFICATION OF THE SEMANTICS AND/OR THE FORMAT DESCRIBING THE SCENE

CROSS-REFERENCE TO RELATED APPLICATIONS

This Application is a Section 371 National Stage Application of International Application No. PCT/EP2007/056223, filed Jun. 21, 2007 and published as WO 2007/147878 on Dec. 27, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure relates to the presentation of multimedia content on a radio communication terminal, for example a mobile radio communication terminal, a PDA ("Personal Digital Assistant"), portable computer, etc.

More precisely, the disclosure relates to the rendering on such a terminal of content having the form of multimedia scenes composed of a plurality of multimedia objects, for example graphics, sound objects, etc. and benefitting or not benefitting from interactive features.

The disclosure applies in particular, but not exclusively, to scene descriptions in SVG format (for "Scalable Vector Graphics"), or to a format based on SVG such as MPEG LASeR, or more generally to scene descriptions in XML format making it possible to use, particular and not exclusively, a DOM programming interface (for "Document Object Model").

Recall here that by multimedia content is meant a set composed of at least one animated graphics scene, also called multimedia scene, and a series of commands making it possible to change this scene from one state to another.

A multimedia scene corresponds in particular to an arrangement of a set of graphics objects in time and in space, with which the user of the radio communication terminal can interact.

The disclosure has applications in all of the fields requiring a representation of the signals in the form of a spatial-temporal arrangement of graphics objects, with interactivity.

The disclosure applies in particular to the already-known formats for describing graphics scenes such as SVG ("Scalable Vector Graphics"), SMIL ("Synchronized Multimedia Integration Language"), XHTML ("eXtensible HyperText Markup Language"), etc.

BACKGROUND OF THE DISCLOSURE

In the SVG format, elements called "graphics" have a visual representation (or similar, such as the audio element), while other elements do not benefit from any visual representation, but have only an activity linked to interactions with other elements, or linked to the unfolding of the animation of other elements of the same multimedia scene.

In the description of multimedia scenes intended to be executed on a given terminal, it can be interesting, in certain contexts, to have the possibility or the choice that all or a portion of the multimedia objects of a scene be or not be rendered and/or played on an interface of the terminal.

By way of an informative example, it is known in the description format of multimedia scenes the multimedia object attribute "display", which makes it possible to "act as if" an element or a group of elements were removed from a multimedia scene, at the moment of the rendering of the latter on a terminal.

As such, by means of this attribute specific to the SVG format, it is possible for an object or multimedia element of a multimedia scene:

to act as if the element having the attribute "display" was no longer in the scene (display='none');

to act as if the element having the attribute "display" was again in the scene ("display" is assigned any other value than the value 'none')

to switch from one to the other by animating this "display" attribute.

A first disadvantage of the "display" attribute if that it is specific to the SVG multimedia scene description format.

A second disadvantage of this "display" attribute is linked to the fact that it applies exclusively to graphic elements. The "display" attribute therefore does not apply to active non-graphic elements, such as SMIL animations, objects of the type that listen to other objects of the scene ("listener" objects for example), or objects of the script type.

In addition, when a multimedia scene, described in the majority of cases in the form of a scene description tree, also called scene tree, contains active elements or objects as well as graphics elements or objects, it is well known in prior art that the renderer of the terminal is obliged to scan the entire scene tree, whether or not the objects/graphic elements are displayed. Such a constraint is however necessary so that that the renderer of terminal can be able to correctly translate the activity of the graphic elements of the multimedia scene.

However, it is well known, in particular for what relates to the implementing and the rendering on radio communication terminals of multimedia scenes by programme written in the JAVA language (registered trademark), that the scan of the scene description tree occupies a major part of the rendering time and alters the quality of service offered to the user.

These disadvantages exist in all the description formats of multimedia scenes that are formed of an assembly of multimedia objects of different categories, of which certain ones can be rendered or not according to a parameter (for example the "display" parameter in the example of the SVG format) and which cohabitate with active objects of which the intrinsic activity is independent of the fact that they are rendered or not.

By way of an informative and non-limiting example, the SVG, LASeR and SMIL multimedia scene description formats fall into this category. In particular, the SVG compatibility of all of the scene remaining to be rendered is put into danger if the choice is made to not process all of the children of an SVG object of which the "display" attribute has the value "none".

SUMMARY

An aspect of the disclosure relates to a method of creating of at least one multimedia scene intended to be rendered on a mobile radio communication terminal, said multimedia scene comprising a plurality of multimedia objects organised in the form of at least one scene description tree.

According to an embodiment of the invention, the method of creating comprises the following steps:
- association to said scene description tree(s) of a sub-tree of the objects to be rendered, comprising objects intended to be rendered at a given instance, and of a standby sub-tree, comprising objects intended not to be rendered at said given instance;
- identification of at least one object, called transferable object, that can be transferred from a first of said sub-trees to the second of said sub-trees according to at least one predetermined transfer condition.

As such, an embodiment of the invention is based on a new and inventive approach of the creating of a multimedia scene in the form of a scene description tree to which are associated two sub-trees, comprising transferable objects from one sub-tree to another.

As such, the objects of the multimedia scene can be identified as being intended to be rendered at a given instance, and to not be rendered at another instance, according to the changes in the scene during its rendering.

An embodiment of the invention consequently provides the possibility of transferring in a controlled manner a multimedia object that is not desired to be rendered on the terminal at a given instance, to an auxiliary tree, called standby sub-tree. All of the objects contained in the standby sub-tree are then hidden from the view of the renderer, the latter considering only the sub-tree of the objects to be rendered.

Preferentially, said objects carry a first identification label, being able to have a first value if the object must be placed in said sub-tree of the objects to be rendered, and a second value, if the object must be placed in said standby sub-tree.

The reading of the value of this first label, during the rendering of the scene, makes it possible to determine if an object must be placed in one or the other of the sub-trees.

In addition, according to an embodiment of the invention, at least one of said objects carries a second locating label, being able to have a first value if at least one of the ascendants of said object is placed in said standby sub-tree.

The reading of this second label makes it possible to determine if an object intended to be rendered at a given instance, although it was not at a previous instance, can effectively be rendered, i.e. to verify that it does has the ascendant(s) needed in the sub-tree of the objects to be rendered.

Advantageously, at least one of said transfer conditions corresponds to a generating event belonging to the group comprising:
- a predetermined delay or instance;
- an action carried out by a user;
- a command sent by a server;
- an event linked to the operation of said terminal,
- or a combination of these events.

As such, the changes in the multimedia scene that can trigger the transfer of an object from one sub-tree to another, are diverse and can correspond for example to a user action (a click, a validation, etc.), to a command transmitted by a server (scene update), to the expiration of a time delay, or to another action triggered by the terminal during the rendering of the scene.

According to an embodiment of the invention, said standby sub-tree and sub-tree of objects to be rendered have a common root. As such, for example, the two sub-trees are two branches of the scene description tree.

According to another embodiment, said standby sub-tree and sub-tree of objects to be rendered are two separate trees. As such, for example, the two sub-trees are separate trees stemming from the scene description tree.

Preferentially, the method of creating comprises a step of defining of an inactive object, called a "phantom" object, intended to replace in said sub-tree of the objects to be rendered an object displaced in said standby sub-tree.

In particular, said "phantom" object carried an identifier making possible the later return of said object displaced in said tree of the objects to be rendered.

As such, the "phantom" object is seen by the renderer as a neutral object that does not require any rendering on said terminal, and makes it possible to locate the position of a removed object, momentarily for example, of the sub-tree of the objects to be rendered and inserted in the standby sub-tree. Indeed, if the object must again be rendered, it will be reinserted in the sub-tree of the objects to be rendered in the place of the "phantom" object, in such a way as to maintain the hierarchy of the sub-tree of the objects to be rendered.

An embodiment of the invention also relates to a computer programme product that can be downloaded from a communication network and/or stored on a support that can be read by computer and/or that can be executed by a microprocessor.

Such a computer programme comprises advantageously programme code instructions for the implementation of the steps of the aforementioned method of creating of at least one multimedia scene intended to be rendered on a mobile radio communication terminal, said multimedia scene comprising a plurality of multimedia objects organised in the form of at least one scene description tree.

An embodiment of the invention also relates to a method of rendering at least one multimedia scene on a mobile radio communication terminal, said multimedia scene comprising a plurality of multimedia objects organised in the form of at least one scene description tree.

According to an embodiment of the invention, such a method comprises the following steps:
- distribution of said objects between two sub-trees, a sub-tree of the objects to be rendered, comprising objects intended to be rendered at a given instance, and a standby sub-tree, comprising objects intended not to be rendered at said given instance;
- transfer of at least one of said objects from a first of said sub-trees to the second of said sub-trees according to at least one predetermined transfer condition;
- reconstruction of said scene at a given instance, using only the objects present in said sub-tree of the objects to be rendered.

As such, during the rendering, the objects of the scene are distributed between two sub-trees, making it possible to then know which of these objects are to be rendered at a given instance.

In addition, according to the changes in the scene, certain objects can be transferred from one sub-tree to another.

Finally, the multimedia scene is reconstructed in order to be rendered, using only the objects present in the sub-tree of the objects to be rendered.

Advantageously, the method of rendering according to an embodiment of the invention includes a step of controlling the presence in said sub-tree of the objects to be rendered of at least one first object required for the rendering of a second object having to be transferred from said standby sub-tree to said sub-tree of the objects to be rendered.

As such, before rendering an object, it can be provided that these ascendants are not in the standby tree, and that the rendering of the object in question is possible.

As specified hereinabove for the method of creating, said step of distributing comprises a step of reading of a first label, for each of the said objects, being able to have a first value if the object must be placed in said sub-tree of the objects to be rendered, and a second value, if the object must be placed in said standby sub-tree.

As indicated hereinabove, said step of controlling comprises a step of reading of a second locating label, being able to have a first value if at least one of the ascendants of said object is placed in said standby sub-tree.

Advantageously, said step of transferring comprises a step of detecting of a generating event belonging to the group comprising:
- a predetermined delay or instance;
- an action carried out by a user;
- a command sent by a server;
- an event linked to the operation of said terminal,
- or a combination of these events.

An embodiment of the invention also relates to a mobile radio communication terminal able to render a multimedia scene, said multimedia scene comprising a plurality of multimedia objects organised in the form of least one scene description tree.

According to an embodiment of the invention, such a terminal comprises:
- means of distributing said objects between two sub-trees, a sub-tree of the objects to be rendered, comprising objects intended to be rendered at a given instance, and a standby sub-tree, comprising objects intended not to be rendered at said given instance;
- means of transferring of at least one of said objects from a first of said sub-trees to the second of said sub-trees according to at least one predetermined transfer condition;
- means of reconstructing said scene at a given instance, using only the objects present in said sub-tree of the objects to be rendered.

Such a terminal is in particular able to implement the steps of the method of rendering described hereinabove.

An embodiment of the invention further relates to a computer programme product that can be downloaded from a communication network and/or stored on a support that can be read by computer and/or that can be executed by a microprocessor.

Such a computer programme comprises advantageously programme code instructions for the implementation of the steps of the aforementioned method of rendering of at least one multimedia scene intended to be rendered on a mobile radio communication terminal, said multimedia scene comprising a plurality of multimedia objects organised in the form of at least one scene description tree.

An embodiment of the invention finally relates to a description signal of a multimedia scene comprising a plurality of multimedia objects organised in the form of at least one scene description tree.

Such a signal comprises objects distributed between two sub-trees, a sub-tree of the objects to be rendered and a standby sub-tree, only the objects present in said sub-tree of the objects to be rendered at a given instance being used to reconstruct said scene, and at least one predetermined transfer condition of at least one object, called transferable object, controlling the transfer of the latter from a first of said sub-trees to the second of said sub-trees.

Advantageously, in such a signal, said objects carry a first identification label, being able to have a first value if the object must be placed in said sub-tree of the objects to be rendered, and a second value, if the object must be placed in said standby sub-tree.

Preferentially, at least one of said objects carries a second locating label, being able to have a first value if at least one of the ascendants of said object is placed in said standby sub-tree.

BRIEF DESCRIPTION OF THE DRAWINGS

Other characteristics and advantages shall appear more clearly when reading the following description of a particular embodiment, provided by way of a simple informative and non-limiting example, and the annexed drawings, among which.

DETAILED DESCRIPTION OF ILLUSTRATIVE EMBODIMENTS

1. General Principle

The general principle of an embodiment of the invention is based on the creation of two sub-trees to describe a multimedia scene, a sub-tree comprising objects intended to be rendered at a given instance, and a sub-tree comprising objects intended not to be rendered at this given instance, and on the possibility of transferring an object from one sub-tree to another, according to events intervening during the rendering of the multimedia scene.

Figure 3:
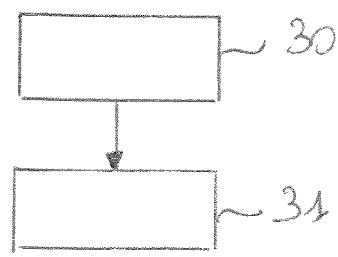
FIG. 3 shows the main steps of the method of creating according to an embodiment of the invention.

In relation with FIG. 3, the main steps of the method of creating a multimedia scene according to an embodiment of the invention is first presented.

A multimedia scene described in the form of a scene description tree is considered.

The first step 30 of associating consists, according to an embodiment of the invention, in associating to this scene description tree two sub-trees:
- a sub-tree of the objects to be rendered,
- a standby sub-tree.

According to the cases, these sub-trees can be independent one in relation to the other, or depend on the scene description tree. Then, during a step 31 of identifying implemented during the creation, or the programming, of the scene, at least one object is identified that can be transferred from one sub-tree to another, and at least one predetermined event that can occur during the rendering of the scene in question, and provoking such a transfer.

Figure 4:
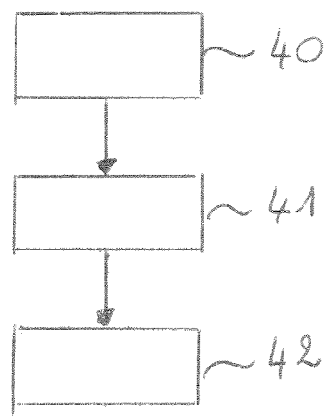
FIG. 4 shows the main steps of the method of rendering according to an embodiment of the invention.

FIG. 4 shows the main steps of the method of rendering a multimedia scene created according to the method of creating described hereinabove.

During the rendering, the objects of the scene description tree are first distributed between the two aforementioned sub-trees (sub-tree of the objects to be rendered and standby sub-tree), during a step 40 of distributing. The initial scene is therefore constructed with the objects present in the sub-tree of the objects to be rendered, the objects of standby sub-tree being ignored. During a step 41 of transferring, certain objects are transferred from one tree to the other. This step of transferring is activated according to predetermined events taking place during the rendering.

Finally, the step 42 of reconstructing consists in reconstructing and in rendering the multimedia scene at a given instance, using only the objects present in the sub-tree of the objects to be rendered.

2. Example of Implementing the Method of Rendering

Figure 5:
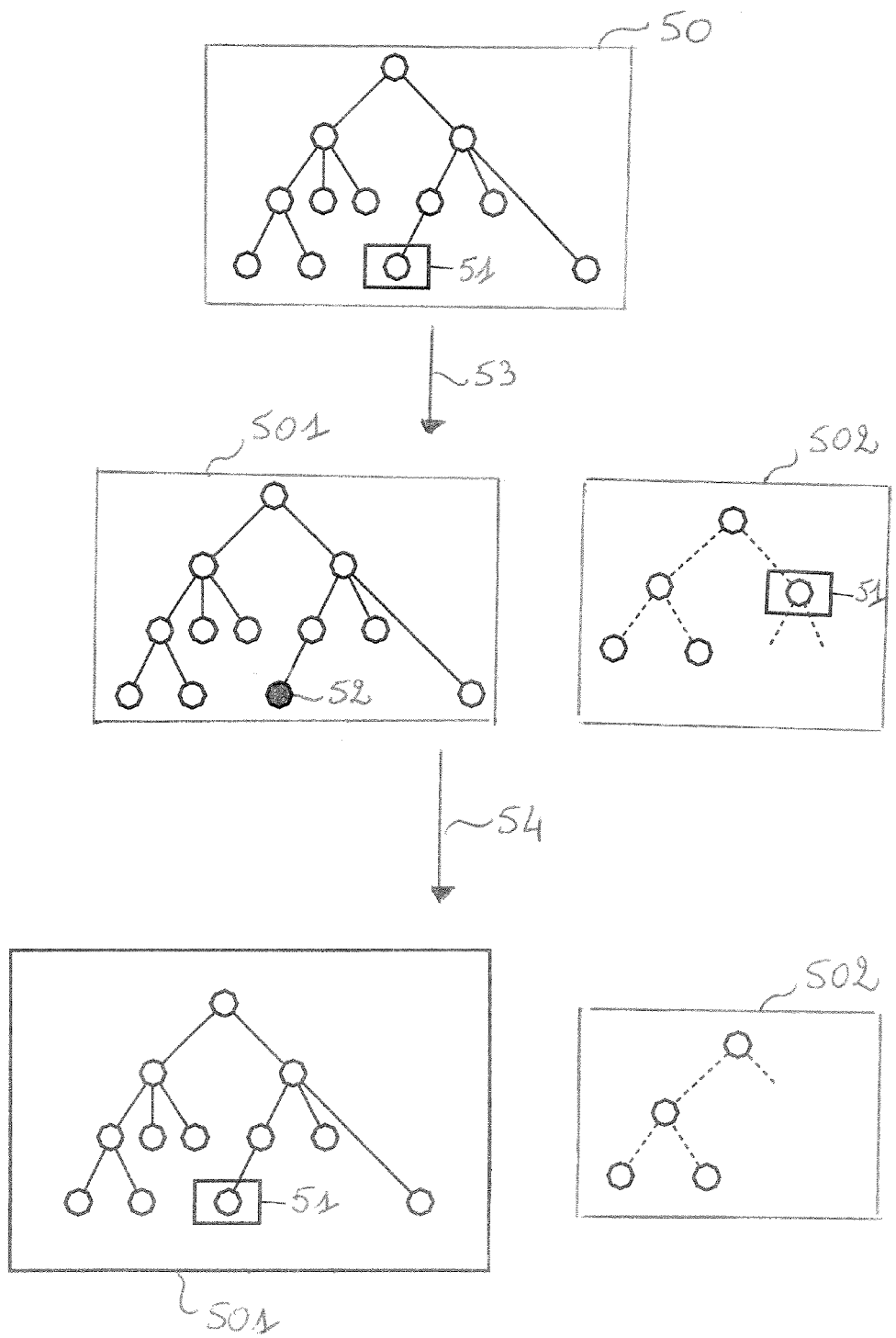
FIG. 5 shows an example of an application of the method of rendering according to an embodiment of the invention.

An example of change of the scene description tree and of the standby sub-tree and sub-tree of objects to be rendered according to an implementation of the method of rendering according to an embodiment of the invention is shown in FIG. 5.

The scene description tree 50 comprises in particular an object 51, intended to not be rendered at a given instance t1 of the rendering of the scene, corresponding to the triggering of an event 53, and this same object 51 is intended to be again rendered at a given instance t2, corresponding to the triggering of an event 54.

The event 53 can be for example an action of the user activating a tab in a first page containing the object 51, in order to display a second page corresponding to this tab. As such, the object 51 therefore must no longer be rendered since it belongs to the first page which is no longer displayed.

The event 54 can be for example the end of the display period of the second page, which is displayed only for 10 seconds, to then allow the first page to display again. In this case, the object 51 must again be rendered.

It is therefore observed in FIG. 5 that at the moment of the triggering of the event 53, the object 51 was replaced by the phantom object 52 in the sub-tree 501 of the objects to be rendered, while the object 51 was inserted in the standby sub-tree 502.

At the moment of the triggering of the event 54, the object 51 is then returned to its position in the sub-tree of the objects to be rendered 501, although it was removed from the standby sub-tree 502.

Figure 6:
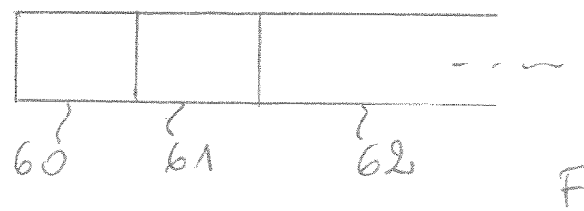
FIG. 6 shows an example of a signal according to an embodiment of the invention.

In relation with FIG. 6, an example of the description signal of a multimedia scene according to an embodiment of the invention for a transferable object according to the invention is also shown.

The signal corresponding to this transferable object carries the data 62, a first identification label 60, being able to have a first value if the object must be placed in said sub-tree of the objects to be rendered, and a second value, if the object must be placed in said standby sub-tree, and a second label 61, being able to have a first value if at least one of the ascendants of said object is placed in said standby sub-tree.

3. Examples of Embodiments

Figure 1:
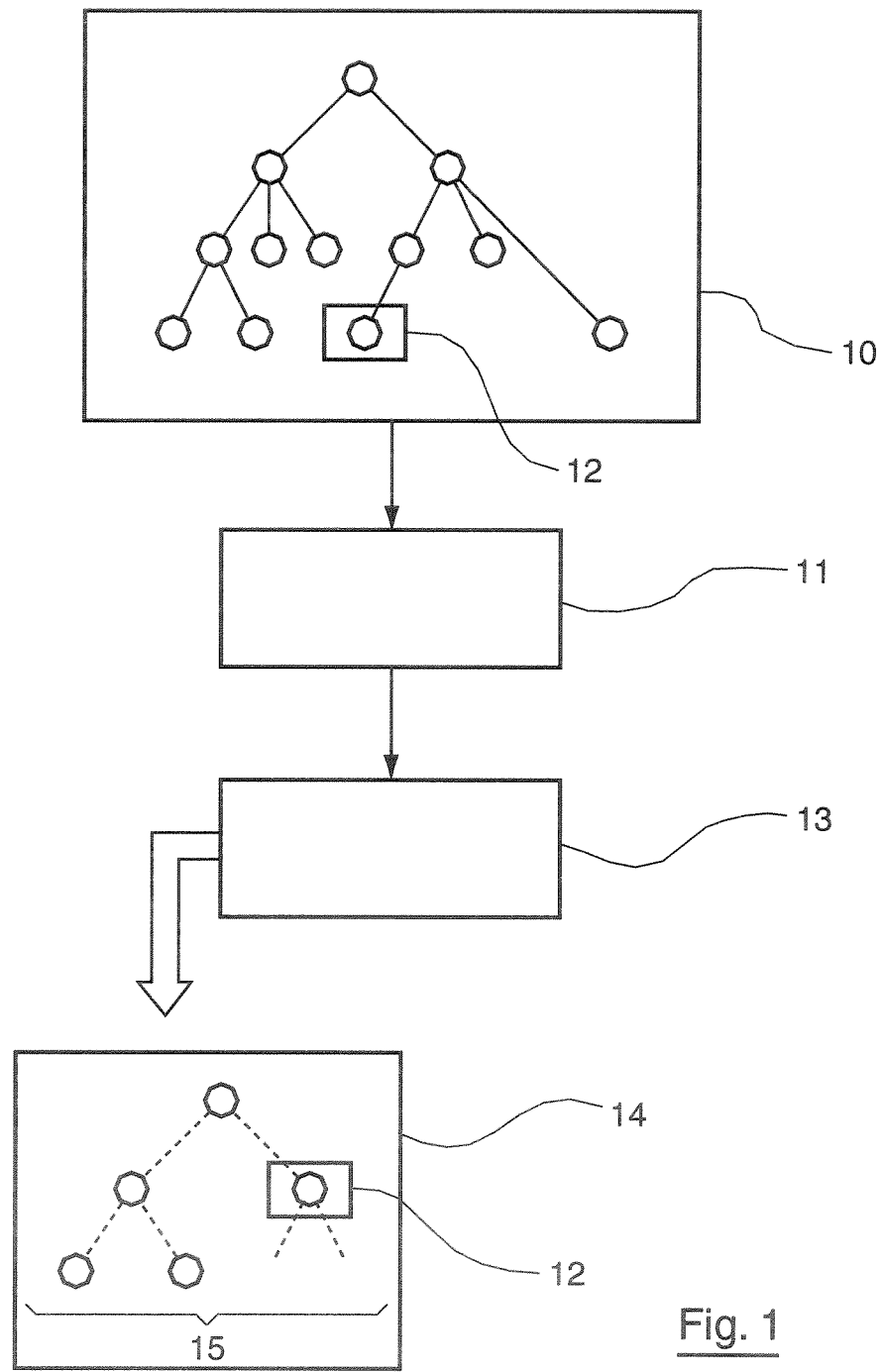
FIG. 1 shows an example of the implementation of the method of creating according to a particular embodiment of the invention.

As shown in FIG. 1, according to an embodiment of the invention, an example of the method of creating comprises advantageously a step 11 of selecting in said scene description tree 10 of at least one multimedia object 12 that the renderer must not render, and a step 13 of inserting of said at least one multimedia object 12 selected in an auxiliary tree 14, called the standby tree, containing all 15 of the multimedia objects of said scene tree 10 that the renderer of said terminal must not render.

Preferentially, said step 11 of selecting is a step of assigning to said at least one multimedia object of at least one indication label that the latter must be inserted in said standby tree and must not be rendered on said terminal.

Advantageously, said step of inserting comprises:

a sub-step of removing in said scene description tree, of said at least one multimedia object selected, called initial object; and a sub-step of assigning in said scene description tree, at the position initially occupied by said removed object, of an inactive object called "phantom" object.

Preferentially, said "phantom" object is seen by the renderer as a neutral object that does not require any rendering on said terminal and, in that it comprises a unique identifier obtained by the application of a bijective function that is separate from the identity function, to the unique identifier of said initial object, in such a way as to maintain a uniqueness between the unique identifier of said initial object inserted in said standby tree and the unique identifier of said "phantom" object inserted in the position of said initial object in said scene description tree.

Advantageously, the method of creating according to an embodiment of the invention implements at least one first update command of the value of the label of at least one multimedia object belonging to said scene description tree, to indicate if said object must be inserted in said standby tree and removed from said scene description tree, and at least one second update command of the value of the label of at least one multimedia object belonging to said standby tree, to indicate its removal from said auxiliary tree and its return to its initial position in said scene description tree.

In an embodiment of the invention, the scene description tree 10 and the standby tree 14 being two trees physically created and independent one in relation to the other, said at least one object selected at said step of selecting is transferred physically from said scene description tree to said standby tree, at said step of inserting.

In an advantageous alternative of the invention, the scene description tree 10 being a tree created physically and the standby tree 14 being a virtual tree created using said scene description tree, said at least one object selected at said step of selecting is assigned at least one second label of value indicating that it is an element of said virtual standby tree, in such a way that it is not rendered on said terminal by the renderer of the latter.

Figure 2:
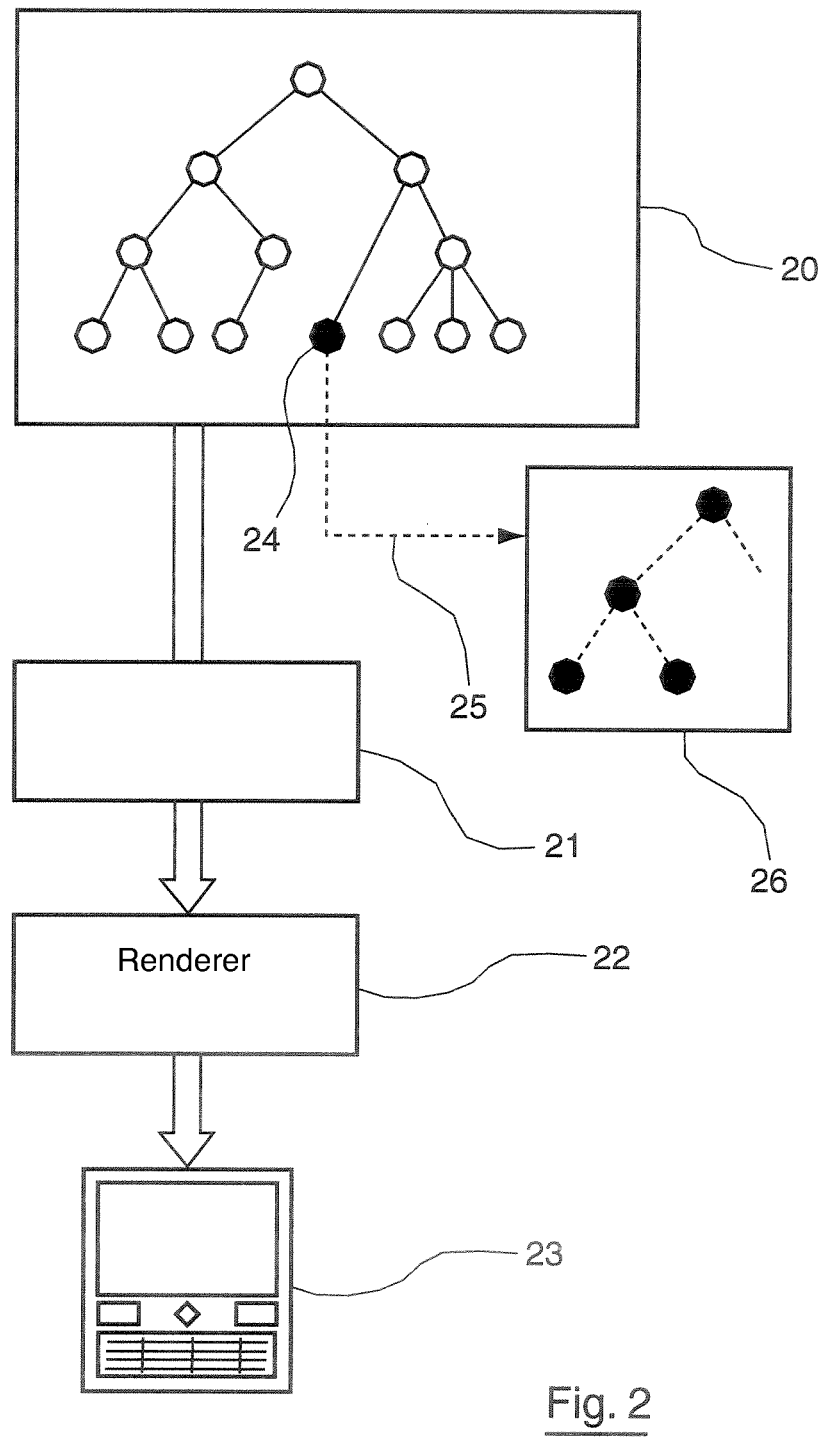
FIG. 2 shows an example of the implementation of the method of rendering according to a particular embodiment of the invention.

According to an embodiment of the invention and as shown in FIG. 2, an example of the method of rendering comprises advantageously a step 21 of reading for each of the said objects of said scene tree 20, of at least one label intended to indicate to said renderer 22 of said terminal 23 if the object 24 in question must be rendered on said terminal 23 or be inserted 25 in an auxiliary tree 26, called the standby tree, and not be rendered on said terminal 23.

Preferentially, said scene description tree being a tree created physically and said standby tree being a virtual tree created using said scene description tree, said method implements an additional step of reading of at least one second label assigned to each of said multimedia objects, said second label indicating if an object in question of said scene must be rendered or if it is an element of said virtual standby tree and must not be rendered on said terminal by the renderer.

An example of an embodiment of the invention is provided here based (in a non exclusive but simply illustrative manner) on the use of a DOM programming interface (for "Document Object Model").

An auxiliary DOM tree, called the standby tree wherein are placed objects temporarily removed from the scene description tree is implemented.

In this example of an embodiment, the multimedia objects or the branches composed of a plurality of multimedia objects are removed from the scene tree by a transaction according to the "removeChild" instruction and inserted in the standby tree by a transaction of the "insertChild" type.

In a possible alternative, the objects or branches are removed from the scene tree by a "replaceChild" transaction, and are thus replaced with a "phantom" object, insensitive to the rendering and inactive.

As such, the objects or branches of the standby tree, since they are no longer part of the scene, no longer have any activity and are not rendered on the terminal.

The rendering process, instead of arriving on the removed objects, arrives in the scene description tree, no longer on the initial active, but now on an inactive "phantom" object, and the question of proceeding with an exploration of the removed branch is therefore no longer at hand, makes it possible advantageously to save in terms of calculation power and time on the terminal.

In addition, the semantics of the objects of the format describing the scene are not modified as is also the case with their method of rendering.

An embodiment of the invention makes use of an independent mechanism of the scene in order to offer a service or makes optimisations possible.

The objects of the scene description tree or the objects of the standby tree (or auxiliary) continue to be accessible by the same mechanisms as beforehand.

In particular, the identifiers must remain unique between the two trees, in order to avoid any ambiguity in the accesses.

The implementations can either contain two entirely separated trees, or use a form of extended tree in such a way as to simulate the behaviour described hereinabove without having to create two separate trees.

There are at least two ways to formulate this type of service as an extension of the scene description:
  in the form of an update command
  in the form of an attribute In the form of an update command, it can be supposed that the scene description already offers a service to update the scene that can be accessed by the intermediary of commands for inserting multimedia objects, for destroying and modifying elements or attributes.

In the case of a scene description format of the MPEG LASeR type, the following commands are defined:
  "Hide": this is a command that takes a branch of the scene description tree designated by the identifier of the root of the branch, and which makes it possible to transfer the complete multimedia object branch in the standby tree. As an offset to the application of this command, in place of the root of the branch, a "phantom" object is placed in order to be easily capable of finding the location of anchoring of the branch again, even if other modifications of the scene tree are made around this point of anchoring.
  "Show": this is a command that takes a branch in the standby tree, also designated by the identifier of the root of the branch, and replaces the "phantom" object placed at the old point of anchoring of the branch in the scene description tree.
  "InsertHidden": this is a command making it possible to create objects in advance, but without directly inserting them in the scene description trees. This is a clone of the "Insert" command that adds a branch in the scene tree at a particular position: the difference is that "InsertHidden" is the equivalent of the two successive commands "Insert" then "Hide" on the same object.

Rather than create an extension in form of an update command, an attribute called here "host" can thus be defined, which can have two values, i.e. "scene" or "aux". This attribute is placed as an external extension to the scene description language (in another "namespace" in XML jargon) on all of the object types of the scene description format. The attribute has a default value of "scene".

When the value of the attribute is "aux", the multimedia object that carries the attribute is placed in the standby tree, as well as all of its children, and the multimedia object is replaced in the scene description tree with a phantom object, neutral in terms of rendering on the terminal once interpreted by the renderer.

When the value of the attribute is "scene" (and when it is as such on all of its ancestors all the way to the root), the element that carries the attribute is placed in the scene tree.

In this alternative, all elements are by default inserted in the scene tree. If an element is inserted with "host=aux", then the resulting situation is the same as that which results from executing the "InsertHidden" instruction in the preceding alternative.

When the value of the "host" attribute is changed from "scene" to "aux", then the resulting situation is the same as that which results from executing the "Hide" instruction in the preceding alternative.

When the value of the "host" attribute is changed from "aux" to "scene", then the resulting situation is the same as that which results from executing the "Show" instruction in the preceding alternative.

It is important to show that the mechanism of "1sr:host" or "Show/Hide/InsertHidden" is:
  independent of the vocabulary: this works just as well on descriptions using the SMIL, xHTML, or SVG scene description formats, or on any other vocabulary of which the elements have or do not have a mechanism of the "display='nonet'" type, as in the SVG format;

In an example of an embodiment of the invention, the invention is applied to LASeR in order to make it possible to manage scenes more effectively and more simply.

Rather than use the SVG attribute "display" with the value "none", which does not deactivate all of the branch of which the root carries the "display=none" attribute, a "1sr:host" attribute with the two "scene" and "aux" values is preferred.

The principle of use of a standby tree is also maintained in order to define the semantics of this attribute, and as such obtain an extension that is independent of the XML vocabulary, orthogonal to SVG, and compatible with SVG, according to the terms of compatibility of extensions with SVG.

The "1sr:host" attribute is defined on all of the LASeR objects, so therefore on all of the SVG objects as well.

The semantics of this attribute are: when the value is "scene", the multimedia object of the scene description tree is considered as being a part of the SVG scene, and when the value of the latter is "aux", this object is then considered as being part of the standby tree and no longer as being a part of the scene tree.

As it is no longer a part of the scene tree, the object is therefore no longer governed by the SVG rendering rules.

To complete the adding of this attribute, the semantics of the update commands of the scene must be modified.

In each update command, there is an identifier designating the object to which the command will apply.

In the absence of an embodiment of the invention, when the command is executed, the search for an object via its unique identifier is carried out in the scene description tree only.

The update commands are then extended in order to apply to the multimedia object of which the identifier is mentioned in the command, whether this object is located in the scene tree or in the standby tree.

When the value of the "1sr:host" attribute is "scene" for a given multimedia object, this object is then reputed to belong to the scene description tree.

The main steps of this method according to an embodiment of the invention are summarised in the following manner:

Step 1: An update command changes this value to "aux".

Step 2: The object is now reputed to belong to the standby tree.

Step 3: An update command changes the value to "scene".

Step 4: The object is now reputed to once again belong to the scene description tree, at the position where it was before the first change in value, regardless of the updates undergone by the scene tree between the steps 2 and 3.

In a particular embodiment, the implementation of two separate trees was chosen.

During the step 1, the target object is removed from the tree. So that its position can be found again regardless of the series of updates having taken place between the steps 2 and 3, a phantom object is inserted in place of it.

This phantom object must have two properties:

this object must be neutral from a rendering standpoint. The SVG format provides us with several choices for this phantom object: the "desc", "title" and "metadata" elements are ignored by the rendering of the renderer, as with all the elements in another "namespace" such as "x:foo", or even a grouping element without a child. According to extended XML vocabulary, the choice of the type of the phantom object can therefore vary.

this object must be marked with a unique identifier that can be found again easily using the identifier of the target multimedia object.

With A, the identifier of the target object, then the identifier of the phantom object must be phantom(A), where phantom (x) is a bijective function and different from the identity. Indeed, when the object A is placed in the standby tree (or auxiliary), so that updates are able to be applied to it, the uniqueness of the identifiers between the two trees must be maintained.

During the step 3, the "1sr:host" attribute of the object A is set to the value "scene". The update command searches for the object A, first in the scene tree, then because it cannot find it, searches for it in the standby tree. The command changes the "1sr:host" value and:

the object of the identifier of phantom(A) is searched for in the scene tree.

It may have moved subsequent to updates that have taken place between the step 2 and 3;

the object A is removed from the standby tree;

the phantom(A) object is replaced with the object A in the scene tree.

As such, subsequent to updates that have taken place between the step 2 and 3, the phantom(A) object can also be found in the auxiliary tree, if for example its parent was placed there. In this case, the replacing of the phantom object (A) with the object A therefore takes place in the standby tree.

The phantom(A) object may also have been deleted from the scene tree, if for example its parent was destroyed. In this case, the object A is destroyed in the step 3.

In another particular embodiment, the implementation of a single tree can be chosen. The two scene and standby trees are then virtual.

In this case, during the step 1, in addition to the fact that its "1sr:host" attribute has the value "aux", the target multimedia object is marked with an indication label "placedInTheAuxiliaryTree" as well as all of its children.

If it is already marked "placedInTheAuxiliaryTree", for example because its parent was removed from the scene tree, then there is nothing else to do except change its "1sr:host" attribute.

The rendering has to be modified in order to ignore an object marked "placedInTheAuxiliaryTree".

During the step 3, the "1sr:host" attribute of the target object is set to "scene" and:

if its parent is marked with the indication label "placedInTheAuxiliaryTree", then processing stops;

if its parent is not marked with the indication label "placedInTheAuxiliaryTree", then the "placedInTheAuxiliaryTree" market of the target object is deleted, as well as that of all of its children, except for those having the "1sr:host=aux" attribute, in which case the indication label "placedInTheAuxiliaryTree" of this child is left unchanged as well as that of all of the children of this child.

In this particular embodiment, the operation of the update commands other than the replacing of the "1sr:host" attribute does not have to be modified.

At a given instance, all of the objects marked with the "placedInTheAuxiliaryTree" indication label are objects that would be located in the standby tree of the previous particular embodiment.

An embodiment of the invention has a mechanism making it possible to simply choose or to select one or several objects (even a complete branch) of the scene description tree that must not be rendered on the terminal of a user, without having to modify the rendering rules specific to the description format chosen for the scene.

An embodiment of the invention implements such a technique making it possible to reduce the rendering time of the scenes in relation to the techniques of prior art.

An embodiment of the invention provides such a technique making it possible to produce simple and inexpensive multimedia terminals that do not require substantial means of processing, or considerable means for memorising data.

Although the present disclosure has been described with reference to one or more examples, workers skilled in the art will recognize that changes may be made in form and detail without departing from the scope of the disclosure and/or the appended claims.

The invention claimed is:

1. A method, comprising:

associating, utilizing a processor, a multimedia scene comprising a plurality of multimedia objects organized in at least one scene description tree with a sub-tree of the objects to be rendered and a standby sub-tree, where the sub-tree comprises objects intended to be rendered at a given instance, and where the standby sub-tree comprises objects intended not to be rendered at the given instance;

identifying a transferable object of the sub-tree able to be transferred between the sub-tree and the standby sub-tree according to at least one predetermined transfer condition;

transferring the transferable object of the sub-tree to the standby sub-tree, the transferable object of the sub-tree having an original unique identifier; and defining an inactive object intended to replace in the sub-tree the transferred object displaced to the standby sub-tree, the inactive object including a unique identifier that enables a return of the transferred object from the standby sub-tree to the sub-tree, wherein the unique identifier of the inactive object is obtained by application of a bijective function to the original unique identifier of the transferred object, such that uniqueness is maintained between the original unique identifier of the object transferred to the standby sub-tree and the unique identifier of the inactive object that replaced the transferred object in the sub-tree;
wherein each of the multimedia objects include a first identification label having a first value if an object is to be placed in the sub-tree of the objects to be rendered, and a second value if the object is to be placed in the standby sub-tree;
wherein at least one of the multimedia objects includes a second locating label having a first value if at least one ascendant of the at least one object is placed in the standby sub-tree.

2. The method of claim 1, wherein the at least one predetermined transfer condition corresponds to a generating event including one or more of a predetermined delay or instance, an action carried out by a user, a command sent by a server, and an event linked to an operation of a terminal.

3. The method of claim 1, wherein the standby sub-tree and the sub-tree have a common root.

4. The method of claim 1, wherein the standby sub-tree and the sub-tree are two separate trees.

5. A computer program product embodied on a non-transitory computer-readable medium, comprising:
code for associating a multimedia scene comprising a plurality of multimedia objects organized in at least one scene description tree with a sub-tree of the objects to be rendered and a standby sub-tree, where the sub-tree comprises objects intended to be rendered at a given instance, and where the standby sub-tree comprises objects intended not to be rendered at the given instance;
code for identifying a transferable object of the sub-tree able to be transferred between the sub-tree and the standby sub-tree according to at least one predetermined transfer condition;
code for transferring the transferable object of the sub-tree to the standby sub-tree, the transferable object of the sub-tree having an original unique identifier; and
code for defining an inactive object intended to replace in the sub-tree the transferred object displaced to the standby sub-tree, the inactive object including a unique identifier that enables a return of the transferred object from the standby sub-tree to the sub-tree, wherein the unique identifier of the inactive object is obtained by application of a bijective function to the original unique identifier of the transferred object, such that uniqueness is maintained between the original unique identifier of the object transferred to the standby sub-tree and the unique identifier of the inactive object that replaced the transferred object in the sub-tree;
wherein each of the multimedia objects include a first identification label having a first value if an object is to be placed in the sub-tree of the objects to be rendered, and a second value if the object is to be placed in the standby sub-tree;
wherein at least one of the multimedia objects includes a second locating label having a first value if at least one ascendant of the at least one object is placed in the standby sub-tree.

6. A method, comprising:
distributing, utilizing a processor, a plurality of multimedia objects organized in at least one scene description tree between a sub-tree of the objects to be rendered and a standby sub-tree, the sub-tree comprising objects intended to be rendered at a given instance, and the standby sub-tree comprising objects intended not to be rendered at the given instance, where a multimedia scene comprises the plurality of multimedia objects;
transferring one of the plurality of multimedia objects of the sub-tree to the standby sub-tree according to at least one predetermined transfer condition, wherein the multimedia object transferred from the sub-tree has an original unique identifier;
defining an inactive object intended to replace in the sub-tree the transferred object displaced to the standby sub-tree, the inactive object including a unique identifier that enables a return of the transferred object from the standby sub-tree to the sub-tree, wherein the unique identifier of the inactive object is obtained by application of a bijective function to the original unique identifier of the transferred object, such that uniqueness is maintained between the original unique identifier of the object transferred to the standby sub-tree and the unique identifier of the inactive object that replaced the transferred object in the sub-tree; and
reconstructing the scene at a given instance, using only the objects present in the sub-tree of the objects to be rendered;
wherein each of the multimedia objects include a first identification label having a first value if an object is to be placed in the sub-tree of the objects to be rendered, and a second value if the object is to be placed in the standby sub-tree;
wherein at least one of the multimedia objects includes a second locating label having a first value if at least one ascendant of the at least one object is placed in the standby sub-tree.

7. The method of claim 6, wherein the method further comprises:
in the sub-tree of the objects to be rendered, controlling a presence of at least one first object required for rendering a second object that is to be transferred from the standby sub-tree to the sub-tree of the objects to be rendered.

8. The method of claim 6, wherein the step of distributing further comprises for each of the multimedia objects, reading first identification label having the first value if the object is to be placed in the sub-tree of the objects to be rendered, and having the second value if the object is to be placed in the standby sub-tree.

9. The method of claim 7, wherein controlling the presence of the at least one first object includes reading the second locating label having the first value if at least one ascendant of the at least one first object is placed in the standby sub-tree.

10. The method of claim 6, wherein transferring the one of the plurality of multimedia objects includes detecting a generating event belonging to one or more of a predetermined delay or instance, an action carried out by a user, a command sent by a server, and an event linked to operation of a terminal.

11. A mobile radio communication terminal, comprising:
a processor for:
distributing a plurality of multimedia objects organized in at least one scene description tree between a sub-tree of the objects to be rendered and a standby sub-tree, the sub-tree comprising objects intended to be rendered at a given instance, and the standby sub-tree comprising objects intended not to be rendered at the given instance, where a multimedia scene comprises the plurality of multimedia objects;
transferring one of the plurality of multimedia objects of the sub-tree to the standby sub-tree according to at least one predetermined transfer condition, wherein the multimedia object transferred from the sub-tree has an original unique identifier;
defining an inactive object intended to replace in the sub-tree the transferred object displaced to the standby sub-tree, the inactive object including a unique identifier that enables a return of the transferred object from the standby sub-tree to the sub-tree, wherein the unique identifier of the inactive object is obtained by application of a bijective function to the original unique identifier of the transferred object, such that uniqueness is maintained between the original unique identifier of the object transferred to the standby sub-tree and the unique identifier of the inactive object that replaced the transferred object in the sub-tree; and reconstructing the scene at a given instance, using only the objects present in the sub-tree of the objects to be rendered;

wherein each of the multimedia objects include a first identification label having a first value if an object is to be placed in the sub-tree of the objects to be rendered, and a second value if the object is to be placed in the standby sub-tree;

wherein at least one of the multimedia objects includes a second locating label having a first value if at least one ascendant of the at least one object is placed in the standby sub-tree.

12. A computer program product embodied on a tangible computer-readable medium, comprising:

computer code for distributing a plurality of multimedia objects organized in at least one scene description tree between a sub-tree of the objects to be rendered and a standby sub-tree, the sub-tree comprising objects intended to be rendered at a given instance, and the standby sub-tree comprising objects intended not to be rendered at the given instance, where a multimedia scene comprises the plurality of multimedia objects;

computer code for transferring one of the plurality of multimedia objects of the sub-tree to the standby sub-tree according to at least one predetermined transfer condition, wherein the multimedia object transferred from the sub-tree has an original unique identifier;

computer code for defining an inactive object intended to replace in the sub-tree the transferred object displaced to the standby sub-tree, the inactive object including a unique identifier that enables a return of the transferred object from the standby sub-tree to the sub-tree, wherein the unique identifier of the inactive object is obtained by application of a bijective function to the original unique identifier of the transferred object, such that uniqueness is maintained between the original unique identifier of the object transferred to the standby sub-tree and the unique identifier of the inactive object that replaced the transferred object in the sub-tree; and computer code for reconstructing the scene at a given instance, using only the objects present in the sub-tree of the objects to be rendered;

wherein each of the multimedia objects include a first identification label having a first value if an object is to be placed in the sub-tree of the objects to be rendered, and a second value if the object is to be placed in the standby sub-tree;

wherein at least one of the multimedia objects includes a second locating label having a first value if at least one ascendant of the at least one object is placed in the standby sub-tree.

13. A method, comprising:

generating, utilizing a processor, a description signal of a multimedia scene, where the multimedia scene comprises a plurality of multimedia objects organized in at least one scene description tree, and where the objects are distributed between a sub-tree of the objects to be rendered and a standby sub-tree, the sub-tree comprising objects intended to be rendered at a given instance, and the standby sub-tree comprising objects intended not to be rendered at the given instance; and rendering the objects in the sub-tree of objects to be rendered on a terminal to reconstruct the scene, using the description signal;

wherein only the objects present in the sub-tree of the objects to be rendered are used to reconstruct the scene;

wherein at least one predetermined transfer condition of an object of the sub-tree controls a transfer of object between the sub-tree and the standby sub-tree, the object of the sub-tree having an original unique identifier;

wherein an inactive object is defined, where the inactive object is intended to replace in the sub-tree an object displaced to the standby sub-tree, the inactive object including a unique identifier that enables a return of the transferred object from the standby sub-tree to the sub-tree, wherein the unique identifier of the inactive object is obtained by application of a bijective function to the original unique identifier of the transferred object, such that uniqueness is maintained between the original unique identifier of the object transferred to the standby sub-tree and the unique identifier of the inactive object that replaced the transferred object in the sub-tree;

wherein each of the multimedia objects include a first identification label having a first value if an object is to be placed in the sub-tree of the objects to be rendered, and a second value if the object is to be placed in the standby sub-tree;

wherein at least one of the multimedia objects includes a second locating label having a first value if at least one ascendant of the at least one object is placed in the standby sub-tree.

14. The method of claim 1, wherein the objects intended not to be rendered at the given instance within the standby sub-tree are hidden from a view of a renderer.

15. The method of claim 1, A method, comprising:

associating, utilizing a processor, a multimedia scene comprising a plurality of multimedia objects organized in at least one scene description tree with a sub-tree of the objects to be rendered and a standby sub-tree, where the sub-tree comprises objects intended to be rendered at a given instance, and where the standby sub-tree comprises objects intended not to be rendered at the given instance;

identifying a transferable object of the sub-tree able to be transferred between the sub-tree and the standby sub-tree according to at least one predetermined transfer condition;

transferring the transferable object of the sub-tree to the standby sub-tree, the transferable object of the sub-tree having an original unique identifier; and defining an inactive object intended to replace in the sub-tree the transferred object displaced to the standby sub-tree, the inactive object including a unique identifier that enables a return of the transferred object from the standby sub-tree to the sub-tree, wherein the unique identifier of the inactive object is obtained by application of a bijective function to the original unique identifier of the transferred object, such that uniqueness is maintained between the original unique identifier of the object transferred to the standby sub-tree and the unique identifier of the inactive object that replaced the transferred object in the sub-tree;

wherein the inactive object is utilized to locate a previously held position of the transferred object in the sub-tree for returning the transferred object to a position in the sub-tree previously held by the transferred object, such that the inactive object is replaced with the transferred object when it is determined that the transferred object must be rendered.

16. The method of claim 1, wherein during execution of an update command, if the transferred object cannot be found in the sub-tree, the unique identifier of the inactive object is located utilizing the bijective function and the original unique identifier of the transferred object.

17. The method of claim 16, further including, A method, comprising:

associating, utilizing a processor, a multimedia scene comprising a plurality of multimedia objects organized in at least one scene description tree with a sub-tree of the objects to be rendered and a standby sub-tree, where the sub-tree comprises objects intended to be rendered at a given instance, and where the standby sub-tree comprises objects intended not to be rendered at the given instance;

identifying a transferable object of the sub-tree able to be transferred between the sub-tree and the standby sub-tree according to at least one predetermined transfer condition;

transferring the transferable object of the sub-tree to the standby sub-tree, the transferable object of the sub-tree having an original unique identifier; and defining an inactive object intended to replace in the sub-tree the transferred object displaced to the standby sub-tree, the inactive object including a unique identifier that enables a return of the transferred object from the standby sub-tree to the sub-tree, wherein the unique identifier of the inactive object is obtained by application of a bijective function to the original unique identifier of the transferred object, such that uniqueness is maintained between the original unique identifier of the object transferred to the standby sub-tree and the unique identifier of the inactive object that replaced the transferred object in the sub-tree;

wherein during execution of an update command, if the transferred object cannot be found in the sub-tree, the unique identifier of the inactive object is located utilizing the bijective function and the original unique identifier of the transferred object;

wherein before rendering each of the multimedia objects in the sub-tree, verifying it is verified that no ascendants of the object to be rendered are located in the standby sub-tree, so that rendering of the object is possible.

* * * * *

UNITED STATES PATENT AND TRADEMARK OFFICE
CERTIFICATE OF CORRECTION

PATENT NO. : 8,477,142 B2
APPLICATION NO. : 12/305928
DATED : July 2, 2013
INVENTOR(S) : Jean-Claude Dufourd et al.

It is certified that error appears in the above-identified patent and that said Letters Patent is hereby corrected as shown below:

In the Claims:
At column 16, claim number 15, line number 33; please delete "The method of claim 1,".
At column 17, claim number 17, line number 6; please delete "The method of claim 16, further including".
At column 18, claim number 17, line number 19; please delete "verifying".

Signed and Sealed this
Nineteenth Day of April, 2016

Michelle K. Lee
*Director of the United States Patent and Trademark Office*